(12) United States Patent
Yoshimichi et al.

(10) Patent No.: US 11,253,943 B2
(45) Date of Patent: Feb. 22, 2022

(54) SEAM WELDING DEVICE

(71) Applicant: HONDA MOTOR CO., LTD., Tokyo (JP)

(72) Inventors: Hitoshi Yoshimichi, Tochigi-ken (JP); Hiroshi Miwa, Tochigi-ken (JP)

(73) Assignee: HONDA MOTOR CO., LTD., Tokyo (JP)

(*) Notice: Subject to any disclaimer, the term of this patent is extended or adjusted under 35 U.S.C. 154(b) by 378 days.

(21) Appl. No.: 16/337,416

(22) PCT Filed: Sep. 26, 2017

(86) PCT No.: PCT/JP2017/034619
§ 371 (c)(1),
(2) Date: Mar. 28, 2019

(87) PCT Pub. No.: WO2018/062123
PCT Pub. Date: Apr. 5, 2018

(65) Prior Publication Data
US 2020/0030906 A1 Jan. 30, 2020

(30) Foreign Application Priority Data
Sep. 29, 2016 (JP) .............................. JP2016-191542

(51) Int. Cl.
B23K 11/06 (2006.01)
(52) U.S. Cl.
CPC .................................... B23K 11/06 (2013.01)
(58) Field of Classification Search
CPC ... B23K 11/067; B23K 11/093; B23K 11/255; B23K 2201/006; B23K 2201/12
(Continued)

(56) References Cited

U.S. PATENT DOCUMENTS 2,412,069 A * 12/1946 Trinks .................... B23K 11/06
219/81
3,596,043 A * 7/1971 Sporri .................. B23K 11/309
219/83
(Continued)

FOREIGN PATENT DOCUMENTS

CN 104918741 9/2015
DE 694383 7/1940
(Continued)

OTHER PUBLICATIONS

Japanese Office Action for Japanese Patent Application No. 2018-542568 dated Jan. 14, 2020.
(Continued)

Primary Examiner — Tu B Hoang
Assistant Examiner — Vy T Nguyen
(74) Attorney, Agent, or Firm — Amin, Turocy & Watson, LLP

(57) ABSTRACT

Provided is a seam welding device capable of seam welding various shapes of objects to be welded. A seam welding device which performs seam welding by causing electricity to be conducted between a first electrode wheel and a second electrode wheel comprises a first motor which drives the first electrode wheel, a second motor which drives the second electrode wheel, and a first belt provided between the first electrode wheel and the first motor. If a direction joining the axes of the first electrode wheel and the second electrode wheel is defined as a vertical direction, the direction from the first electrode wheel toward the second electrode wheel is upward, and the direction from the second electrode wheel toward the first electrode wheel is downward, then the first motor is disposed further upward than a point of contact of the first electrode wheel and the second electrode wheel.

6 Claims, 6 Drawing Sheets

(58) Field of Classification Search
USPC .................................................. 219/101, 104
See application file for complete search history.

(56) References Cited

U.S. PATENT DOCUMENTS

| | | | | | |
|---|---|---|---|---|---|
| 3,597,571 | A | * | 8/1971 | McGill | B23K 11/061 219/81 |
| 4,258,245 | A | * | 3/1981 | Flaherty | B23K 11/309 219/81 |
| 4,664,587 | A | * | 5/1987 | Case, Jr. | B23K 9/287 219/124.1 |
| 5,042,281 | A | * | 8/1991 | Metcalfe | B21B 13/14 72/200 |
| 5,811,750 | A | * | 9/1998 | Caprioglio | B23K 11/309 219/81 |
| 2011/0163074 | A1 | * | 7/2011 | Kaga | B23K 11/087 219/83 |
| 2011/0233173 | A1 | * | 9/2011 | Kaneko | B23K 11/061 219/83 |
| 2014/0061168 | A1 | * | 3/2014 | Nakakura | B23K 11/061 219/82 |
| 2015/0283644 | A1 | * | 10/2015 | Kawai | B23K 11/36 219/82 |
| 2016/0045975 | A1 | * | 2/2016 | Yamaashi | B23K 11/06 219/83 |

FOREIGN PATENT DOCUMENTS

| | | |
|---|---|---|
| DE | 1330306 | 9/1973 |
| GB | 1330306 | 9/1973 |
| JP | 07-096371 | 4/1995 |
| JP | 08-010960 | 1/1996 |
| JP | 2014-155950 | 8/2014 |

OTHER PUBLICATIONS

International Search Report and Written Opinion for International Application No. PCT/JP2017/034619 dated Dec. 19, 2017, 13 pages.

Chinese Office Action for Chinese Patent Application No. 201780060725.1 dated Aug. 3, 2020.

* cited by examiner

SEAM WELDING DEVICE

TECHNICAL FIELD

The present invention relates to a seam welding apparatus (device) that performs seam welding by a current flowing between a first electrode wheel and a second electrode wheel in a state in which a laminated object to be welded is sandwiched between the first electrode wheel and the second electrode wheel.

BACKGROUND ART

In Japanese Laid-Open Patent Publication No. 2014-155950, a seam welding apparatus attached to an arm of a robot is disclosed. In the technology described in Japanese Laid-Open Patent Publication No. 2014-155950, an object to be welded is fixed in a predetermined location and the seam welding apparatus performs seam welding by being moved by the robot with respect to the object to be welded.

SUMMARY OF INVENTION

In the seam welding apparatus disclosed in Japanese Laid-Open Patent Publication No. 2014-155950, a servomotor that drives an electrode wheel is provided coaxially with the electrode wheel (the electrode roller). Since an object to be welded has to have a shape that does not interfere with the servomotor, there is a possibility that the shape of an object to be welded on which seam welding can be performed is limited.

The present invention has been made to solve the above-described problem and an object thereof is to provide a seam welding apparatus that can perform seam welding on objects to be welded of various shapes.

The present invention is a seam welding apparatus that performs seam welding by a current flowing between a first electrode wheel and a second electrode wheel in a state in which a laminated object to be welded is sandwiched between the first electrode wheel and the second electrode wheel. The seam welding apparatus includes: a first motor that drives the first electrode wheel; a second motor that drives the second electrode wheel; and a first endless transfer member that is provided between the first electrode wheel and the first motor to transfer the driving force of the first motor to the first electrode wheel. On a condition that a line connecting the axes of the first electrode wheel and the second electrode wheel extends vertical, a direction from the first electrode wheel to the second electrode wheel is upward, and a direction from the second electrode wheel to the first electrode wheel is downward, the first motor is disposed above a point of contact between the first and second electrode wheels in a state in which the first electrode wheel and the second electrode wheel are in contact with each other.

With this configuration, it is possible to reduce the size of the occupied space around the first electrode wheel in the seam welding apparatus. Therefore, it is possible to prevent interference between the seam welding apparatus and the object to be welded and perform seam welding on the objects to be welded of various shapes.

Moreover, the seam welding apparatus may include a power supply line that supplies power to the first electrode wheel, and the power supply line may be disposed so as to pass through the inner space of the first transfer member.

Furthermore, the first motor may be disposed above the axis of the second electrode wheel, the second motor may be disposed above the first motor, and, between the second electrode wheel and the second motor, a second endless transfer member that transfers the driving force of the second motor to the second electrode wheel may be provided. This makes it possible to reduce the size of the occupied space around the second electrode wheel in the seam welding apparatus.

In addition, the driving force of the first motor may be transferred to the first transfer member via a speed reducer. As a result, it is possible to dispose the speed reducer, which is relatively large in volume, in a location away from the first electrode wheel and the second electrode wheel. This makes it possible to reduce the size of the occupied space around the first electrode wheel and the second electrode wheel in the seam welding apparatus.

Furthermore, above the second electrode wheel, an actuator that moves the second electrode wheel in a direction in which the second electrode wheel moves closer to the first electrode wheel and a direction in which the second electrode wheel moves away from the first electrode wheel may be provided. By disposing the first motor and the second motor in an upper part of the seam welding apparatus where the occupied space is relatively large due to the actuator disposed therein, it is possible to reduce the space around the first electrode wheel in the seam welding apparatus while preventing the influence of an increase in the occupied space in an upper part of the seam welding apparatus from being increased.

According to the present invention, it is possible to prevent interference between the seam welding apparatus and the object to be welded and perform seam welding on the objects to be welded of various shapes.

DESCRIPTION OF EMBODIMENTS

Hereinafter, a preferred embodiment of a seam welding apparatus according to the present invention will be described in detail with reference to the accompanying drawings.

Figure 1:
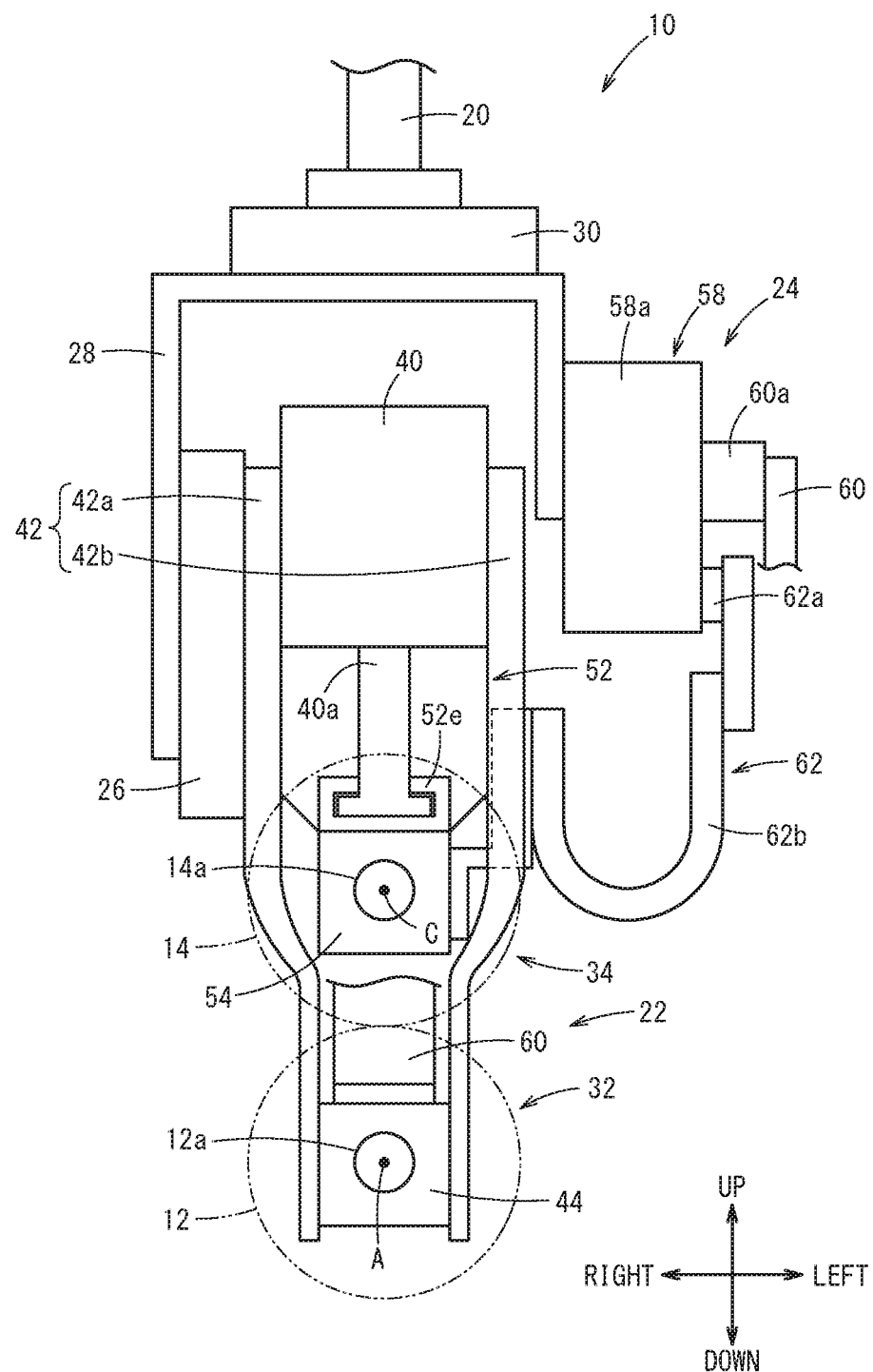
FIG. 1 is a schematic front view of a seam welding apparatus.
Figure 2:
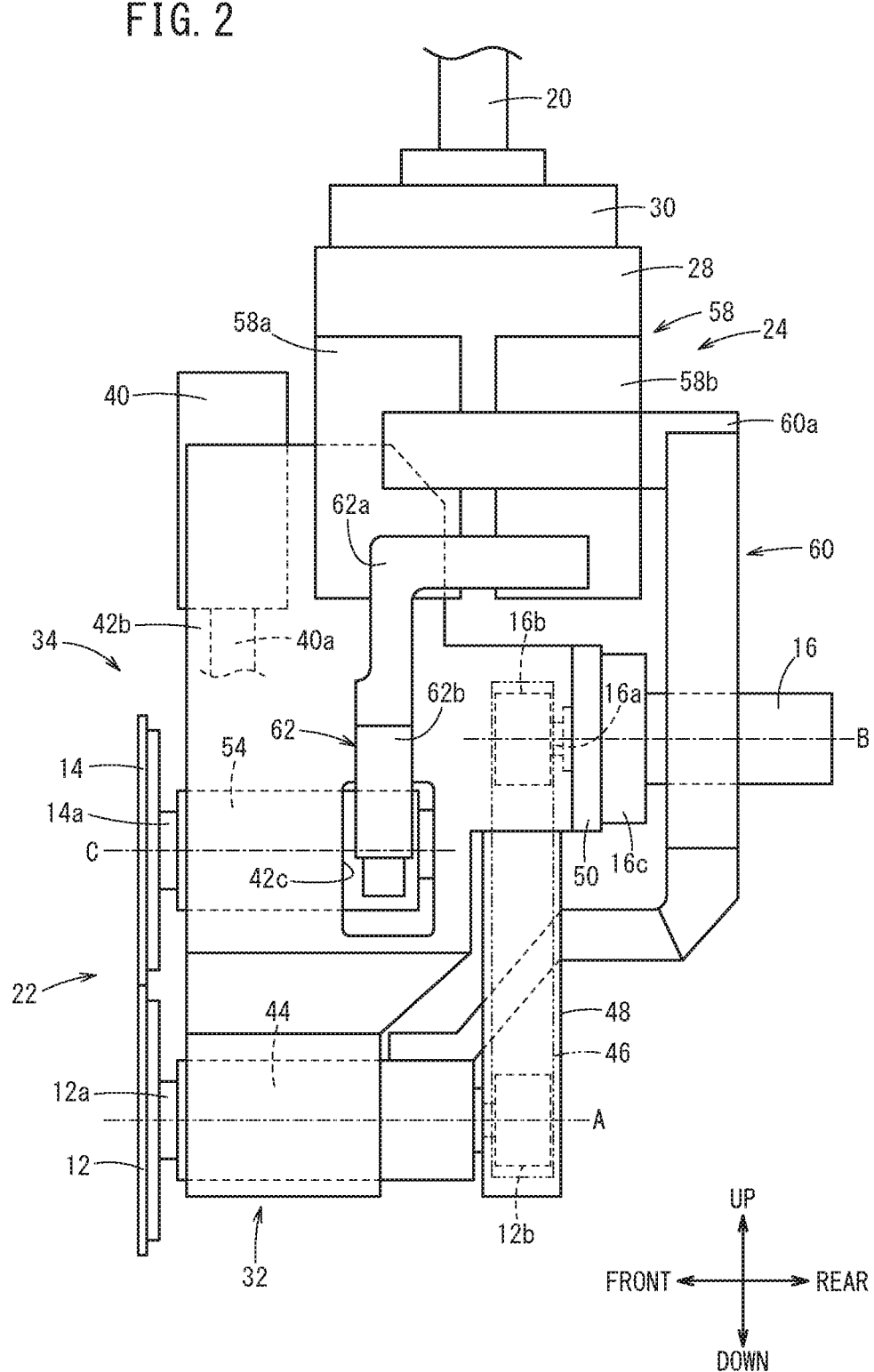
FIG. 2 is a schematic left side view of the seam welding apparatus depicted in FIG. 1.
Figure 3:
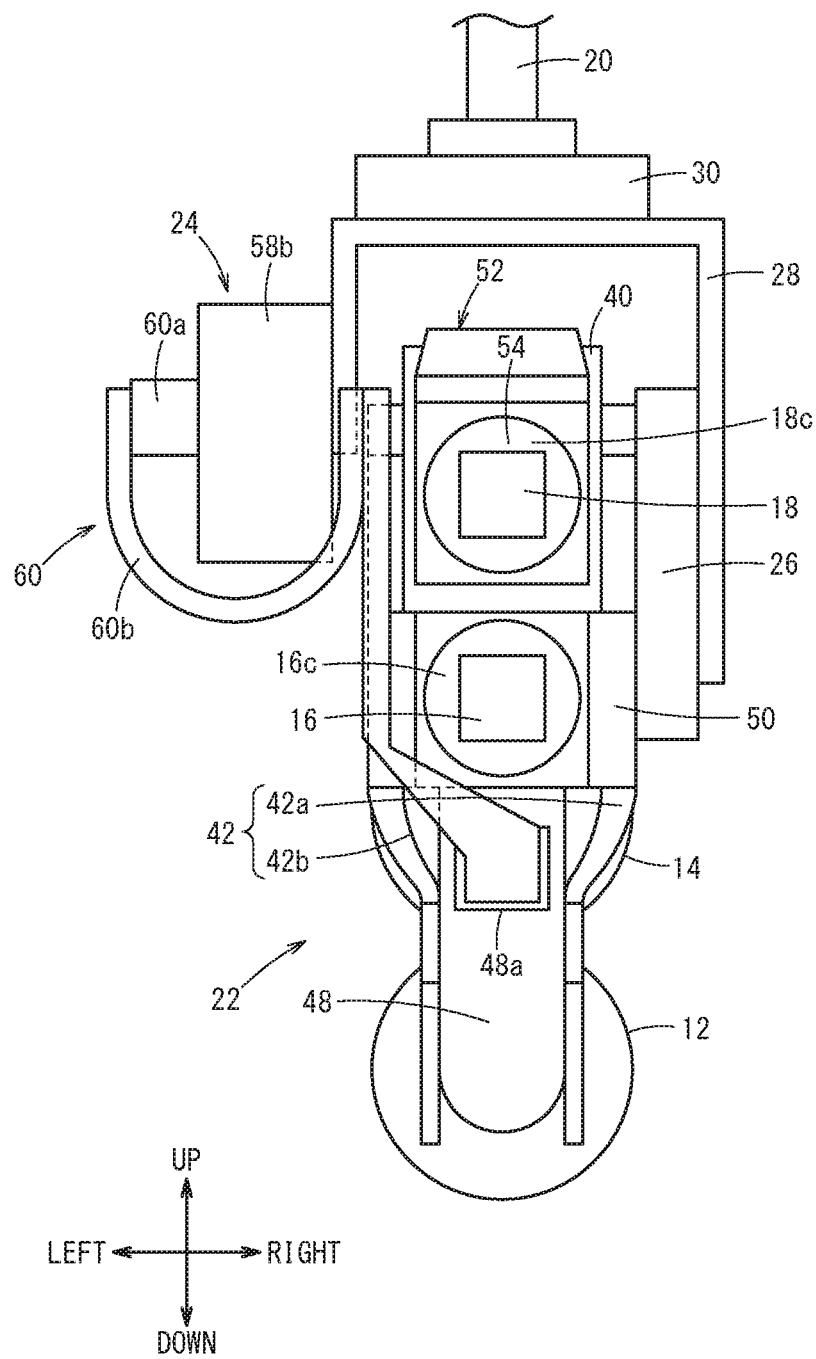
FIG. 3 is a schematic rear view of the seam welding apparatus depicted in FIG. 1.

FIG. 1 is a schematic front view of a seam welding apparatus 10, FIG. 2 is a schematic left side view of the seam welding apparatus 10, and FIG. 3 is a schematic rear view of the seam welding apparatus 10. In FIG. 1, to make the structures of the rear faces of a first electrode wheel 12 and a second electrode wheel 14 easily visible, the first electrode wheel 12 and the second electrode wheel 14 are indicated by virtual lines (chain double-dashed lines) and the structures of the rear faces of the first electrode wheel 12 and the second electrode wheel 14 are indicated by solid lines.

[Overall Configuration of the Seam Welding Apparatus]

The seam welding apparatus 10 is an apparatus that performs seam welding by a current flowing between the first electrode wheel 12 and the second electrode wheel 14 in a state in which an unillustrated object to be welded formed of laminated thin metal plates is sandwiched between the first electrode wheel 12 and the second electrode wheel 14. The seam welding apparatus 10 of the present invention is suitably used as a seam welding apparatus that welds the inner periphery of a member such as a doorframe part of an automobile. The seam welding apparatus 10 is attached to an arm 20 of an unillustrated robot. The robot can move the seam welding apparatus 10 to any location and in any position. The seam welding apparatus 10 can prevent interference between the seam welding apparatus and the object to be welded while moving relative to the object to be welded and can perform seam welding on the objects to be welded of various shapes.

Here, for explanations which are given below, description of up and down, right and left, and front and rear in the drawings is defined. A line connecting the axes of the first electrode wheel 12 and the second electrode wheel 14 when the seam welding apparatus 10 is viewed from the direction of an axis A of the first electrode wheel 12 and an axis C of the second electrode wheel 14 (for example, when the seam welding apparatus 10 is viewed in a state of FIG. 1) is assumed to be a vertical. Moreover, in the vertical direction, a direction from the first electrode wheel 12 to the second electrode wheel 14 is assumed to be upward, above or upper and a direction from the second electrode wheel 14 to the first electrode wheel 12 is assumed to be downward, below, or lower. The direction of the axis A of the first electrode wheel 12 is assumed to extend in a front-rear direction. Furthermore, in the front-rear direction, a direction in which a first electrode wheel shaft 12a extends from the first electrode wheel 12 is assumed to be rearward, rear, or behind and the opposite direction thereof is assumed to be forward, or front. A direction perpendicular to the vertical direction and the front-rear direction is assumed to be a right-left direction. Moreover, when a front area is viewed from the rear, a left side is assumed to be left and a right side is assumed to be right. The vertical direction, the front-rear direction, the right-left direction, above, upper, downward, below, lower, front, rearward, rear, behind, right, and left are expressions adopted for convenience of an explanation of the seam welding apparatus 10; for instance, downward, below, and lower are not limited to the direction of gravity.

The seam welding apparatus 10 includes a main body section 22 and a power supplying section 24. The main body section 22 is supported on a base 28 with an equalizer 26 placed therebetween. The power supplying section 24 is supported on the base 28. The base 28 is supported on the arm 20 of the robot with an automatic tool changer 30 placed therebetween. The equalizer 26 supports the main body section 22 in such a way that the main body section 22 can move relative to the base 28 in the vertical direction. A welding position of the object to be welded is programmed into the robot in advance. The robot moves the location and position of the seam welding apparatus 10 in accordance with the programmed welding position of the object to be welded. Since the equalizer 26 supports the main body section 22 in such a way that the main body section 22 can move relative to the base 28, it is possible to make the movement of the main body section 22 follow minute displacement of the actual welding position from the welding position programmed into the robot. In accordance with a production process, the robot changes an apparatus which the arm 20 grasps. The arm 20 can automatically grasp or release the automatic tool changer 30 under the control of the robot.

[Configuration of the Main Body Section]

The main body section 22 includes a first electrode mechanism 32 having the first electrode wheel 12, a second electrode mechanism 34 having the second electrode wheel 14, a first motor 16 driving the first electrode wheel 12, a second motor 18 driving the second electrode wheel 14, an actuator 40 moving the second electrode wheel 14 closer to or away from the first electrode wheel 12, a first frame 42 that supports the first electrode mechanism 32 and the first motor 16, and a second frame 52 that supports the second electrode mechanism 34 and the second motor 18.

The first motor 16 and the second motor 18 are servomotors. The first motor 16 and the second motor 18 drive the first electrode wheel 12 and the second electrode wheel 14, respectively, so as to rotate the first electrode wheel 12 and the second electrode wheel 14 in predetermined directions of rotation at predetermined rotational speeds.

The actuator 40 has inside thereof unillustrated servomotor and ball screw mechanism and moves a rod 40a in the vertical direction. The actuator 40 is not limited to an actuator using the servomotor and the ball screw mechanism; for example, the actuator 40 may be an air cylinder, a hydraulic cylinder, or a linear motor. The lower end of the rod 40a is fixed to the second frame 52 supporting the second electrode mechanism 34, which will be described later, and, as a result of the rod 40a moving in the vertical direction, the whole of the second electrode mechanism 34 can be moved in the vertical direction. This makes it possible to move the second electrode wheel 14 closer to or away from the first electrode wheel 12. The actuator 40 can adjust the welding pressure which is applied when the object to be welded is sandwiched between the first electrode wheel 12 and the second electrode wheel 14.

Power is supplied to the first electrode wheel 12 and the second electrode wheel 14 from the power supplying section 24, which will be described later. By a current flowing between the first electrode wheel 12 and the second electrode wheel 14 in a state in which the object to be welded is sandwiched between the first electrode wheel 12 and the second electrode wheel 14, the object is welded.

Figure 4:
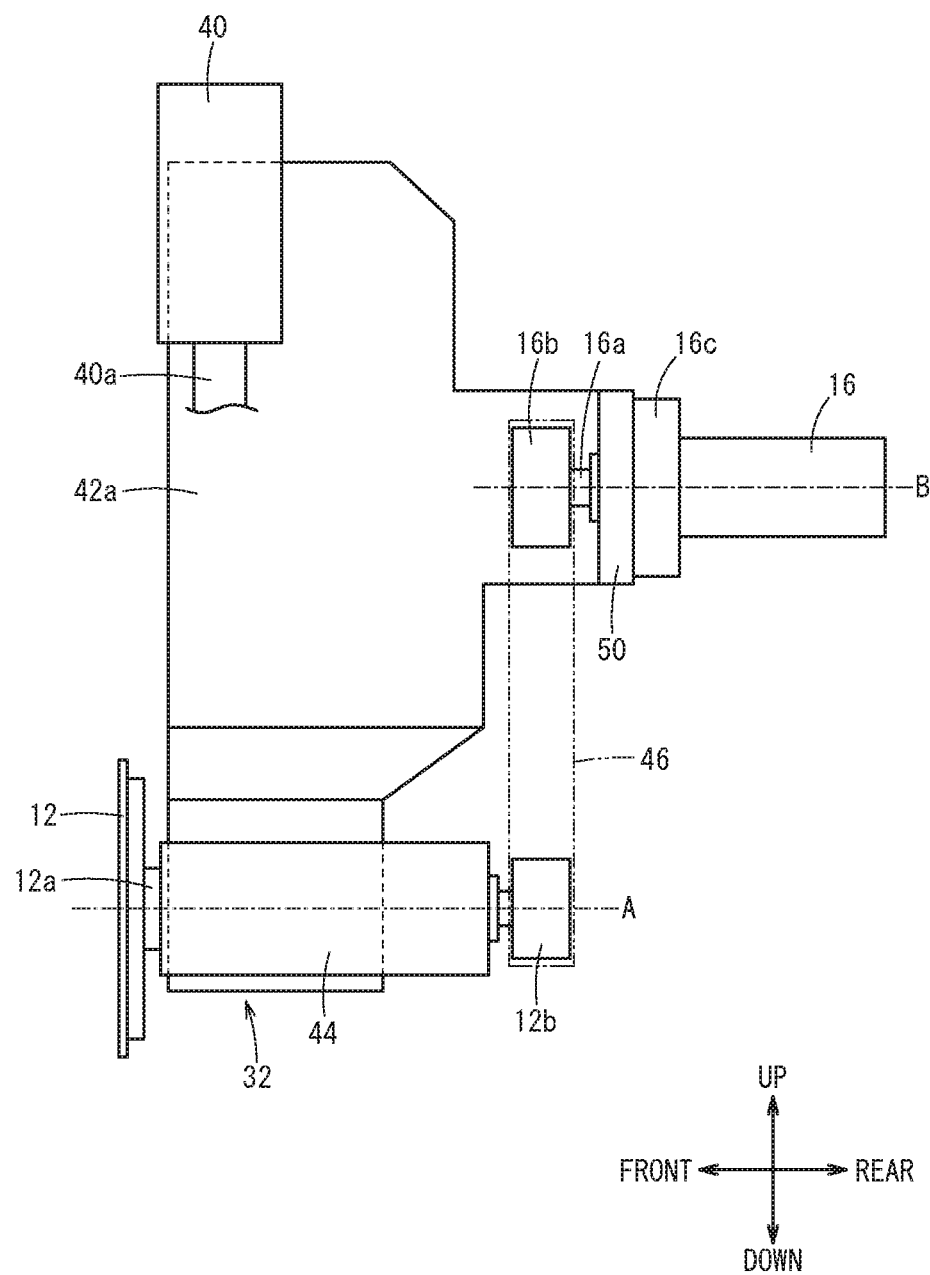
FIG. 4 is a schematic explanatory diagram depicting the configuration of a drive system of a first electrode wheel depicted in FIG. 1.

The first electrode mechanism 32 and the first motor 16 are supported on the first frame 42 (see FIG. 4). The first electrode mechanism 32 includes the first electrode wheel 12, the first electrode wheel shaft 12a extending rearward from the first electrode wheel 12, and a first bearing case 44 that rotatably supports the first electrode wheel shaft 12a. The axis A of the first electrode wheel shaft 12a and an axis B of a first motor rotating shaft 16a, which is a rotating shaft of the first motor 16, are disposed in such a way that the locations thereof in the vertical direction are different from each other, and the first motor 16 is disposed above the axis A of the first electrode wheel shaft 12a. At the rear end of the first electrode wheel shaft 12a, a first driven pulley 12b that rotates integrally with the first electrode wheel shaft 12a is provided. At the front end of the first motor rotating shaft 16a, a first drive pulley 16b that rotates integrally with the first motor rotating shaft 16a is provided. A first belt (a first transfer member) 46 is wound between the first driven pulley 12b and the first drive pulley 16b. The driving force of the first motor 16 is transferred to the first electrode wheel 12 via the first belt 46. The almost entire portion of the first belt 46 is covered with a belt cover 48. The first motor 16 includes a first speed reducer 16c, and the number of revolutions is reduced by the first speed reducer 16c and is output to the first drive pulley 16b.

The first frame 42 is configured with a first member 42a and a second member 42b which are two plate-like members disposed so as to be separated from each other in the right-left direction. The first member 42a is disposed on the right side, and the second member 42b is disposed on the left side. When the first frame 42 is viewed from the front-rear direction (for example, when the first frame 42 is viewed in a state of FIG. 1), the first member 42a and the second member 42b are formed so as to extend from an upper part downward. The first member 42a and the second member 42b are formed so as to bend in directions in which the first member 42a and the second member 42b get closer to each other below the midpoint in the vertical direction and then extend downward again. The first member 42a and the second member 42b are each formed in such a way that the thickness thereof below a bent portion is smaller than the thickness above the bent portion. The first member 42a and the second member 42b are each formed in such a way that, in the bent portion, the thickness thereof gets gradually smaller downward from an upper part.

The first bearing case 44 is fixed at the lower end of the first frame 42 with bolts or the like in a state in which the first bearing case 44 is sandwiched between the first member 42a and the second member 42b (see FIG. 1). The first motor 16 is fixed in the midpoint of the first frame 42 in the vertical direction so as to be located in a rearward position (see FIG. 4). The first motor 16 is fixed to the first frame 42 with bolts or the like with a mount 50, which is provided across the space between the first member 42a and the second member 42b, placed therebetween (see FIGS. 2 and 3).

Figure 5:
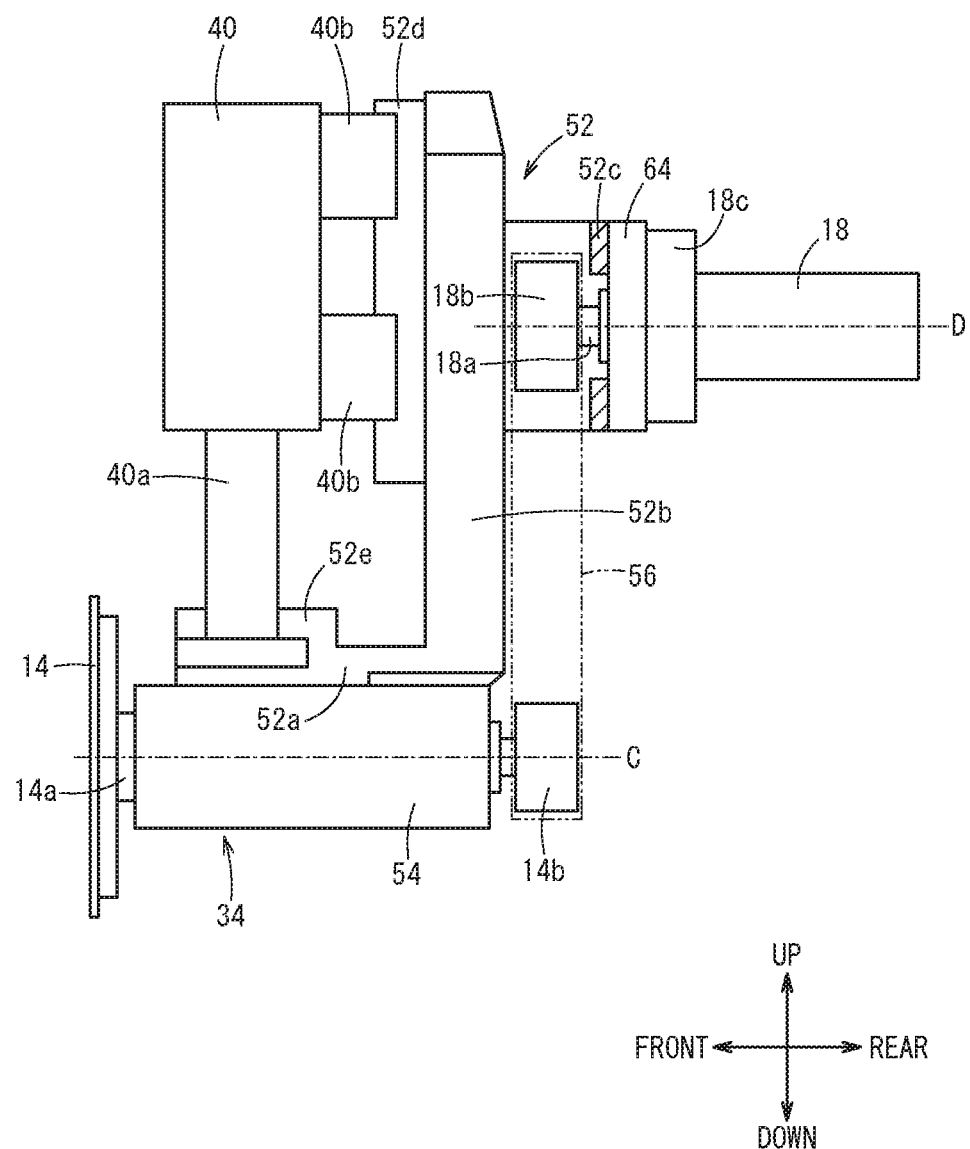
FIG. 5 is a schematic explanatory diagram depicting the configuration of a drive system of a second electrode wheel depicted in FIG. 1.

The second electrode mechanism 34 and the second motor 18 are supported on the second frame 52 (see FIG. 5). The second electrode mechanism 34 includes the second electrode wheel 14, a second electrode wheel shaft 14a extending rearward from the second electrode wheel 14, and a second bearing case 54 that rotatably supports the second electrode wheel shaft 14a. The axis C of the second electrode wheel shaft 14a and an axis D of a second motor rotating shaft 18a, which is a rotating shaft of the second motor 18, are disposed in such a way that the positions thereof in the vertical direction are different from each other, and the second motor 18 is disposed above the axis C of the second electrode wheel shaft 14a. At the rear end of the second electrode wheel shaft 14a, a second driven pulley 14b that rotates integrally with the second electrode wheel shaft 14a is provided. At the front end of the second motor rotating shaft 18a, a second drive pulley 18b that rotates integrally with the second motor rotating shaft 18a is provided. A second belt (a second transfer member) 56 is wound between the second driven pulley 14b and the second drive pulley 18b. The driving force of the second motor 18 is transferred to the second electrode wheel 14 via the second belt 56. The second motor 18 includes a second speed reducer 18c, and the number of revolutions is reduced by the second speed reducer 18c and is output to the second drive pulley 18b.

The second frame 52 includes a fixation section 52a which is formed so as to extend in the front-rear direction and an upright section 52b which is formed so as to extend in the vertical direction (see FIG. 5). The second bearing case 54 is fixed to the lower face of the fixation section 52a with bolts or the like. The second motor 18 is fixed to a side face of the upright section 52b in a rearward position thereof in an area slightly closer to an upper part than a central part in the vertical direction. In a location of the upright section 52b where the second motor 18 is attached, an extension section 52c extending rearward from the upright section 52b is formed. The second motor 18 is fixed to the extension section 52c with bolts or the like with a mount 64 placed therebetween.

The actuator 40 is fixed with bolts or the like in a state in which the actuator 40 is sandwiched between the first member 42a and the second member 42b of the first frame 42 (see FIG. 1). On the front side face of the upright section 52b of the second frame 52, a rail 52d extending in the vertical direction is formed. A guide 40b extending from the rear side face of the actuator 40 engages the rail 52d. As a result, the second frame 52 is supported so as to be movable with respect to the actuator 40 in the vertical direction.

The lower end of the rod 40a of the actuator 40 is attached to a rod receiving section 52e, which is formed in the fixation section 52a of the second frame 52, in such a way that the lower end cannot move relative to the second frame 52 in the vertical direction. The second frame 52 is provided in the first frame 42 with the actuator 40 placed therebetween in such a way that the second frame 52 can move relatively in the vertical direction. In a state in which the second frame 52 is attached to the first frame 42, the second electrode wheel 14 is located above the first electrode wheel 12. When the actuator 40 moves the rod 40a in the vertical direction, the second frame 52 moves in the vertical direction with respect to the first frame 42. At this time, the second electrode mechanism 34 and the second motor 18 which are fixed to the second frame 52 also integrally move in the vertical direction with respect to the first frame 42. Since the first electrode mechanism 32 having the first electrode wheel 12 is fixed to the first frame 42, the second electrode wheel 14 of the second electrode mechanism 34 can move (can move closer to or away from the first electrode wheel 12) in the vertical direction with respect to the first electrode wheel 12.

[Configuration of the Power Supplying Section]

The power supplying section 24 supplies power to be used at the time of welding of the portion to be welded to the first electrode wheel 12 and the second electrode wheel 14. The power supplying section 24 includes a transformer (a power transformer) 58, a first power supply line (a power supply line) 60, and a second power supply line 62. The transformer 58 adjusts (transforms) a voltage input from the outside of the seam welding apparatus 10 and supplies the voltage to the first electrode wheel 12 and the second electrode wheel 14. The transformer 58 outputs an alternating current; alternatively, by providing a rectifier or the like downstream of the transformer 58, a direct current may be supplied to the first electrode wheel 12 and the second electrode wheel 14. The transformer 58 is configured with a first transformer 58a and a second transformer 58b and is fixed to the base 28 in a state in which the first transformer 58a and the second transformer 58b are arranged in the front-rear direction. This makes it possible to collectively dispose the transformer 58, which is relatively heavy, in a location near the base 28 (in particular, the automatic tool changer 30). Compared to a case where one large transformer 58 is fixed to the base 28, since the first transformer 58a and the second transformer 58b can be disposed in such a way that the positions of the center of gravity thereof are brought closer to the arm 20 of the robot with respect to the base 28, the moment of inertia of the seam welding apparatus 10 is easily reduced.

The first power supply line 60 is an electric wire that supplies the power output from the transformer 58 to the first electrode wheel 12. An end of the first power supply line 60 on a side where the transformer 58 is located is connected to the first transformer 58*a* and the second transformer 58*b* with a conductor 60*a* placed therebetween (see FIG. 2). An end of the first power supply line 60 on a side where the first electrode wheel 12 is located is connected to the first electrode wheel shaft 12*a* inside the first bearing case 44. The current output from the transformer 58 is supplied to the first electrode wheel 12 via the first power supply line 60, wiring inside the first bearing case 44, and the first electrode wheel shaft 12*a*.

The second power supply line 62 is an electric wire that supplies the power output from the transformer 58 to the second electrode wheel 14. An end of the second power supply line 62 on a side where the transformer 58 is located is connected to the first transformer 58*a* and the second transformer 58*b* with a conductor 62*a* placed therebetween (see FIG. 2). An end of the second power supply line 62 on a side where the second electrode wheel 14 is located is connected to the second electrode wheel shaft 14*a* inside the second bearing case 54. The current output from the transformer 58 is supplied to the second electrode wheel 14 via the second power supply line 62, wiring inside the second bearing case 54, and the second electrode wheel shaft 14*a*.

The first power supply line 60 and the second power supply line 62 include a first flexible section 60*b* and a second flexible section 62*b*, respectively. Even when the first electrode mechanism 32 and the second electrode mechanism 34 move with respect to the base 28 in the vertical direction, the displacement in the vertical direction can be absorbed by the first flexible section 60*b* and the second flexible section 62*b*.

[Details of the Placement of the Main Body Section]

The placement of the members of the main body section 22 will be described by using FIG. 6. The second electrode wheel 14 is disposed above the first electrode wheel 12. The first motor 16 and the second motor 18 are disposed above a point of contact E between the first electrode wheel 12 and the second electrode wheel 14 in a state in which the first electrode wheel 12 and the second electrode wheel 14 are in contact with each other. Furthermore, the first motor 16 and the second motor 18 are disposed above the axis C of the second electrode wheel 14. In addition, the second motor 18 is disposed above the first motor 16. Moreover, the actuator 40 is disposed above the second electrode wheel 14.

As a result, in a region behind the belt cover 48 and below the axis C, other members of the main body section 22 are not disposed, which makes it possible to secure space. Moreover, it is possible to collectively dispose the first motor 16, the second motor 18, and the actuator 40, which are relatively heavy, in an upper part of the seam welding apparatus 10 near the arm 20. As a result, compared to a case where the first motor 16, the second motor 18, and the actuator 40 are provided in locations away from the arm 20, the moment of inertia of the seam welding apparatus 10 is easily reduced.

[Details of the Placement of the Power Supplying Section]

The transformer 58 is disposed above the second electrode wheel 14. This makes it possible to collectively dispose the transformer 58, which is relatively heavy, in an upper part of the seam welding apparatus 10 near the arm 20 together with the first motor 16, the second motor 18, and the actuator 40. As a result, compared to a case where the transformer 58 is provided in a location away from the arm 20, the moment of inertia of the seam welding apparatus 10 is easily reduced.

In a rearward position of the belt cover 48, an opening 48*a* is formed below the axis C of the second electrode wheel 14 and above the point of contact E between the first electrode wheel 12 and the second electrode wheel 14. In a front position of the belt cover 48, an opening 48*b* is formed below the point of contact E between the first electrode wheel 12 and the second electrode wheel 14 and above the first bearing case 44.

The first power supply line 60 enters the belt cover 48 through the opening 48*a*, passes through the inner space of the first belt 46, and leaves the belt cover 48 through the opening 48*b*. The first power supply line 60 is connected to the first electrode wheel shaft 12*a* from the upper side face of the first bearing case 44 (see FIGS. 1, 2, and 6).

As a result of the first motor 16 and the second motor 18 being disposed above the axis C of the second electrode wheel 14, it is possible to secure space below the axis C and behind the belt cover 48. Of this space, in the space above the point of contact E between the first electrode wheel 12 and the second electrode wheel 14, the first power supply line 60 can be disposed.

In the inner space, which is a dead space, of the first belt 46 extending to an area below the point of contact E between the first electrode wheel 12 and the second electrode wheel 14, the first power supply line 60 is disposed. This makes it possible to dispose the first power supply line 60 below the point of contact E without newly occupying the space below the point of contact E.

The first power supply line 60 is connected to the first bearing case 44 on the upper side face of the first bearing case 44, above which the space is already occupied by the second electrode mechanism 34. As a result, the first power supply line 60 can be connected to the first bearing case 44 without occupying the space around the first bearing case 44 (the space on both sides of the first bearing case 44 and below the first bearing case 44) which is not occupied by other members.

In the second member 42*b* which is the left-hand member of the first frame 42, an opening 42*c* is formed in a location in which the second bearing case 54 is disposed. The second power supply line 62 enters the first frame 42 through the opening 42*c*. The second power supply line 62 is connected to the second electrode wheel shaft 14*a* from the right side face of the second bearing case 54 (see FIGS. 2 and 6).

[Effects]

The seam welding apparatus 10 of the present invention can perform seam welding on the inner periphery of an object to be welded such as a doorframe part of an automobile. Moreover, the seam welding apparatus 10 performs seam welding on an object to be welded of any shape while moving relative to the object to be welded.

For this reason, in the seam welding apparatus 10 of the present embodiment, the first motor 16 is disposed above the point of contact E between the first electrode wheel 12 and the second electrode wheel 14. As a result, compared to a case where the first motor 16 is provided coaxially with the first electrode wheel 12, it is possible to reduce the size of the occupied space below the point of contact E (that is, around the first electrode wheel 12) in the seam welding apparatus 10. This makes it possible to prevent interference between the seam welding apparatus 10 and the object to be welded and perform seam welding on the objects to be welded of various shapes.

Moreover, in the seam welding apparatus 10 of the present embodiment, the first power supply line 60 that supplies power to the first electrode wheel 12 from the transformer 58 disposed above the second electrode wheel 14 is disposed so as to pass through the inner space, which is a dead space, of the first belt 46. Furthermore, when the seam welding apparatus 10 is viewed from the front-rear direction (for example, when the seam welding apparatus 10 is viewed in the state of FIG. 1), the first power supply line 60 does not overhang to the right and to the left with respect to the first bearing case 44. As a result, compared to a case where the first power supply line 60 is disposed on the side of the outer periphery of the first belt 46, it is possible to reduce the size of the occupied space around the first electrode wheel 12 in the seam welding apparatus 10. This makes it possible to prevent interference between the seam welding apparatus 10 and the object to be welded and perform seam welding on the objects to be welded of various shapes.

Figure 6:
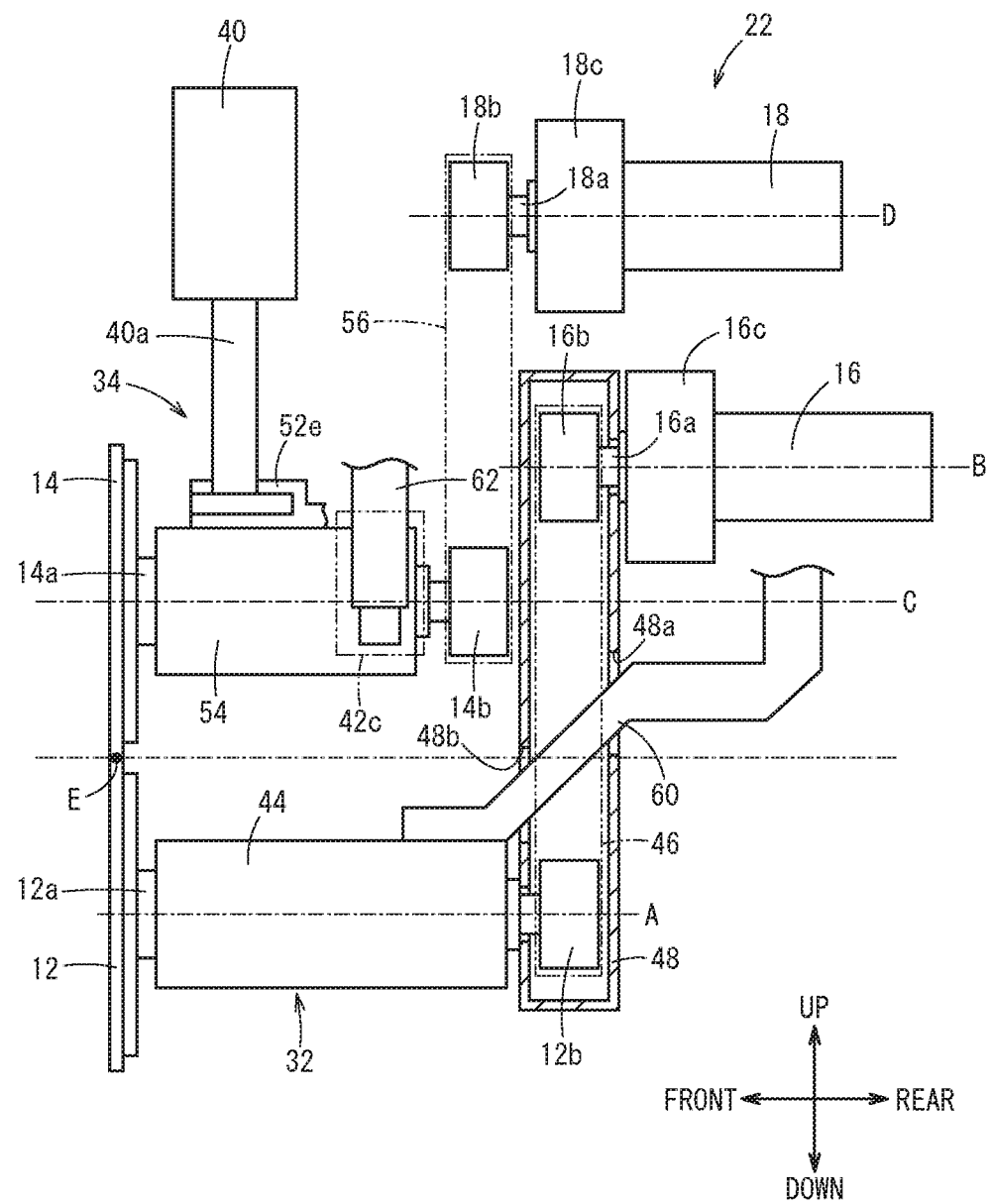
FIG. 6 is a schematic explanatory diagram depicting the positional relationship among the first electrode wheel, the second electrode wheel, a first motor, and a second motor which are depicted in FIG. 1.

Furthermore, in the seam welding apparatus 10 of the present embodiment, the first motor 16 is disposed above the axis C of the second electrode wheel 14 and the second motor 18 is disposed above the first motor 16 (see FIG. 6). As a result, it is possible to reduce the size of the occupied space in a region below the axis C in the seam welding apparatus 10. This makes it possible to prevent interference between the seam welding apparatus 10 and the object to be welded and perform seam welding on the objects to be welded of various shapes.

In addition, in the seam welding apparatus 10 of the present embodiment, the first motor 16 and the second motor 18 include the first speed reducer 16c and the second speed reducer 18c, respectively. This makes it possible to dispose the first speed reducer 16c and the second speed reducer 18c, which are relatively large in volume, in locations away from the first electrode wheel 12 and the second electrode wheel 14. Therefore, it is possible to make effective use of the space around the first electrode wheel 12 and the second electrode wheel 14 in the seam welding apparatus 10. As a result, it is possible to prevent interference between the seam welding apparatus 10 and the object to be welded and perform seam welding on the objects to be welded of various shapes. Moreover, since the number of revolutions of the first drive pulley 16b and the second drive pulley 18b can be reduced by the first speed reducer 16c and the second speed reducer 18c, it is possible to prevent the first belt 46 and the second belt 56 from becoming detached from the first drive pulley 16b and the second drive pulley 18b.

Furthermore, the seam welding apparatus 10 of the present embodiment includes the actuator 40, which moves the second electrode wheel 14 in a direction in which the second electrode wheel 14 moves closer to the first electrode wheel 12 and a direction in which the second electrode wheel 14 moves away from the first electrode wheel 12, above the second electrode wheel 14. In an area above the second electrode wheel 14 in which the first motor 16 and the second motor 18 are disposed, the actuator 40 is disposed. By disposing the first motor 16 and the second motor 18 in an upper part of the seam welding apparatus 10 where the occupied space is inherently large, it is possible to reduce the space in a lower part of the seam welding apparatus 10 (around the first electrode wheel 12) while preventing the influence of an increase in the occupied space in an upper part of the seam welding apparatus 10 from being increased.

Other Embodiments

While the present invention has been described based on the embodiment, the specific configuration of each invention is not limited to the embodiment and various design changes and so forth can be made within the scope of the invention.

For example, in the present embodiment, the first motor 16 and the second motor 18 are configured with servomotors. The first motor 16 and the second motor 18 may be configured with, for example, normal motors provided with a pulse motor or a rotary encoder and are not limited to particular motors.

Moreover, in the present embodiment, the first belt 46 is wound between the first driven pulley 12b and the first drive pulley 16b and the second belt 56 is wound between the second driven pulley 14b and the second drive pulley 18b. It goes without saying that each of the first belt 46 and the second belt 56 may be configured with a chain and each of the first driven pulley 12b, the second driven pulley 14b, the first drive pulley 16b, and the second drive pulley 18b may be configured with a gear.

What is claimed is:

1. A seam welding apparatus for seam welding by a current flowing between a first electrode wheel and a second electrode wheel in a state in which a laminated object to be welded is sandwiched between the first electrode wheel and the second electrode wheel, the seam welding apparatus comprising:
    a first motor that drives the first electrode wheel;
    a second motor that drives the second electrode wheel; and
    a first endless transfer member that is provided between the first electrode wheel and the first motor to transfer a driving force of the first motor to the first electrode wheel, wherein
    on a condition that a line connecting axes of the first electrode wheel and the second electrode wheel extends vertical, a direction from the first electrode wheel to the second electrode wheel is upward, and a direction from the second electrode wheel to the first electrode wheel is downward, the first motor is disposed above a point of contact between the first electrode wheel and the second electrode wheel in a state in which the first electrode wheel and the second electrode wheel are in contact with each other,
    the first motor is disposed above an axis of the second electrode wheel,
    the second motor is disposed above the first motor, and
    between the second electrode wheel and the second motor, a second endless transfer member that transfers a driving force of the second motor to the second electrode wheel is provided,
    the first endless transfer member and the second endless transfer member are arranged in parallel.

2. The seam welding apparatus according to claim 1, comprising:
    a power supply line that supplies power to the first electrode wheel, wherein
    the power supply line is disposed so as to pass through an inner space of the first transfer member.

3. The seam welding apparatus according to claim 1, wherein
    the driving force of the first motor is transferred to the first transfer member via a speed reducer.

4. The seam welding apparatus according to claim 1, comprising:
    above the second electrode wheel, an actuator that moves the second electrode wheel in a direction in which the second electrode wheel moves closer to the first electrode wheel and a direction in which the second electrode wheel moves away from the first electrode wheel.

5. The seam welding apparatus according to claim 1, wherein
    the first endless transfer member and the second endless transfer member are belts.

6. The seam welding apparatus according to claim 1, wherein
the first endless transfer member and the second endless transfer member are chains.

* * * * *